(No Model.)

J. JENKINSON.
AXLE.

No. 396,572. Patented Jan. 22, 1889.

Witnesses:
Harold Serrell
Chas H. Smith

Inventor
James Jenkinson
per Lemuel W. Serrell
Atty.

UNITED STATES PATENT OFFICE.

JAMES JENKINSON, OF BROOKLYN, NEW YORK.

AXLE.

SPECIFICATION forming part of Letters Patent No. 396,572, dated January 22, 1889.

Application filed February 15, 1886. Renewed May 10, 1888. Serial No. 273,391. (No model.)

*To all whom it may concern:*

Be it known that I, JAMES JENKINSON, of Brooklyn, E. D., in the county of Kings and State of New York, have invented an Improvement in Carriage-Axles, of which the following is a specification.

Carriage-axles have been made of a bar having holes in the ends for receiving the screw-threaded and removable axles, and screw locking-nuts have held the parts together; but they are expensive to construct and the parts are unnecessarily heavy.

My invention is made for cheapening the construction and for obtaining greater strength than heretofore and for allowing the axles to be removed from the axle-bar when worn out or when new axles are required to fit new wheel-boxes.

Figure 1:
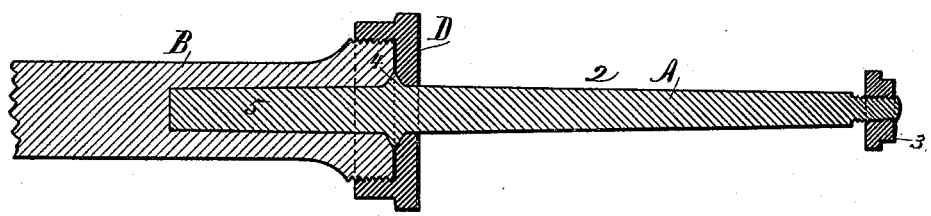
Figure 2:

In the drawings, Figure 1 is a section of the axle-bar, clamp-nut, and removable axle; and Fig. 2 is an elevation of the axle separately.

The axle A is made out of an iron or steel bar of a diameter slightly larger than the largest portion of the said axle, such bar being preferably rolled or drop-forged to a shape approximating the shape of the axle, so as to consolidate the metal and obtain the maximum strength, and there are no offsets or shoulders upon the axle-pin to render it liable to break at such shoulders, as now common in axles; but the portion 2 is tapering, with a screw and nut, 3, or other fastening device at the outer end, as usual, and there is a small conical collar, 4, left in turning off the exterior surface of the axle A. The inner end, 5, of the axle is cylindrical or it may be tapering.

The axle-bar B is of any usual or desired size, and into each end there is a hole bored for the reception of the portion 5 of the axle A, and the exterior of said axle-bar B is sufficiently upset to be screw-threaded to receive the nut D, which is screwed upon it, and said nut has a central hole sufficient to allow the nut to pass on over the axle, and by screwing up this nut D the axle A will be confined into the hole at the end of the axle-bar in the most firm and reliable manner, and the double conical surfaces of the collar 4 are clamped so that the axle cannot escape from the hole in the axle-bar.

This axle can be cheaply made, as almost all the parts are turned or bored by machinery.

I do not claim an axle-bar having a hole for the removable axle, nor a screw coupling-nut for connecting the removable axle. In cases where the coupling-nut has screwed upon the movable axle there has to be a considerable enlargement at the inner part of the removable axle for the screw-thread, and when the movable axle has a square end and a collar the uniformity of strength cannot be obtained, because the forging thereof renders the metal unequal in quality and strength. By my improvement little or no forging is required and uniformity of strength is obtained.

I claim as my invention—

The combination, with the axle-bar having a hole in the end and a nut screwing upon such axle-bar, of a removable axle having a round inner end that fits the hole in the axle-bar, a conical collar that is clamped by the nut, and a tapering outer end, substantially as specified.

Signed by me this 11th day of February, A. D. 1886.

J. JENKINSON.

Witnesses:
GEO. T. PINCKNEY,
WILLIAM G. MOTT.